United States Patent [19]
Koziol

[11] 4,069,996
[45] Jan. 24, 1978

[54] ICE CREAM CONE PACKING JACKET AND HOLDER

[76] Inventor: Leon W. Koziol, 1925 Virginia Ave., Beach Haven, N.J. 08008

[21] Appl. No.: 733,756

[22] Filed: Oct. 19, 1976

[51] Int. Cl.² .............................................. A47G 23/02
[52] U.S. Cl. .................................... 248/146; 141/391; 211/2; 220/85 H; 229/1.5 H
[58] Field of Search ............... D1/99; D7/70; D9/10, D9/12, 176, 221; 53/390; 141/391; 211/2, 14, 15; 220/85 H; 229/1.5 H; 248/145.3, 145.6, 146

[56] References Cited

U.S. PATENT DOCUMENTS

| | | | |
|---|---|---|---|
| D. 148,100 | 12/1947 | Weber | D7/70 |
| 395,409 | 1/1889 | Waters | 248/145.6 |
| 1,742,939 | 1/1930 | Sloan | 248/146 |
| 1,829,664 | 10/1931 | McKay | 211/2 |
| 2,483,166 | 9/1949 | Amberg | 248/145.3 |
| 2,487,712 | 11/1949 | Johnson et al. | 248/145.3 |
| 2,509,133 | 5/1950 | Carew | 248/145.3 X |
| 2,610,492 | 9/1952 | Carew | 248/145.3 |
| 2,661,610 | 12/1953 | Treff | 248/145.3 |
| 2,665,571 | 1/1954 | Lochead | 211/2 |
| 3,932,113 | 1/1976 | Thrush | 215/10X |

FOREIGN PATENT DOCUMENTS

| | | | |
|---|---|---|---|
| 532,942 | 11/1921 | France | 211/14 |
| 640,579 | 7/1950 | United Kingdom | 248/145.3 |
| 102,105 | 11/1916 | United Kingdom | 248/146 |

*Primary Examiner*—Lawrence J. Staab
*Attorney, Agent, or Firm*—Robert K. Youtie

[57] ABSTRACT

A packing jacket and holder for ice cream cones including a generally tubular body tapering inwardly from one end for receiving a sugar cone in said one end, and having an enlarged cup on the other end for receiving the enlarged head of a cake cone in the enlarged cup.

3 Claims, 5 Drawing Figures

ICE CREAM CONE PACKING JACKET AND HOLDER

BACKGROUND OF THE INVENTION

As is well known, the placement of ice cream dips in cones requires a degree of training and skill to avoid breaking the cones, and there is also a problem of holding filled cones while filling additional cones.

SUMMARY OF THE INVENTION

It is, therefore, an important object of the present invention to provide an appliance for use with ice cream cones which is adapted to serve both as a packing jacket to reinforce the cone during the packing operation, and also as a holder, as for standing on a horizontal support to hold a cone while others are being filled.

It is a further object of the present invention to provide an ice cream cone packing jacket and holder having the advantageous characteristics mentioned in the preceding paragraph, wherein a single device is capable of use with different styles of ice cream cones, snugly reinforcing or backing the various styles of cones to permit effective packing with ice cream, and also serving to support or hold the various styles of cones stably in an upright position on a horizontal surface.

It is still another object of the present invention to provide an ice cream cone packing jacket and holder which is extremely simple in construction, staunch and durable for a long useful life, and capable of economic manufacture for sale at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
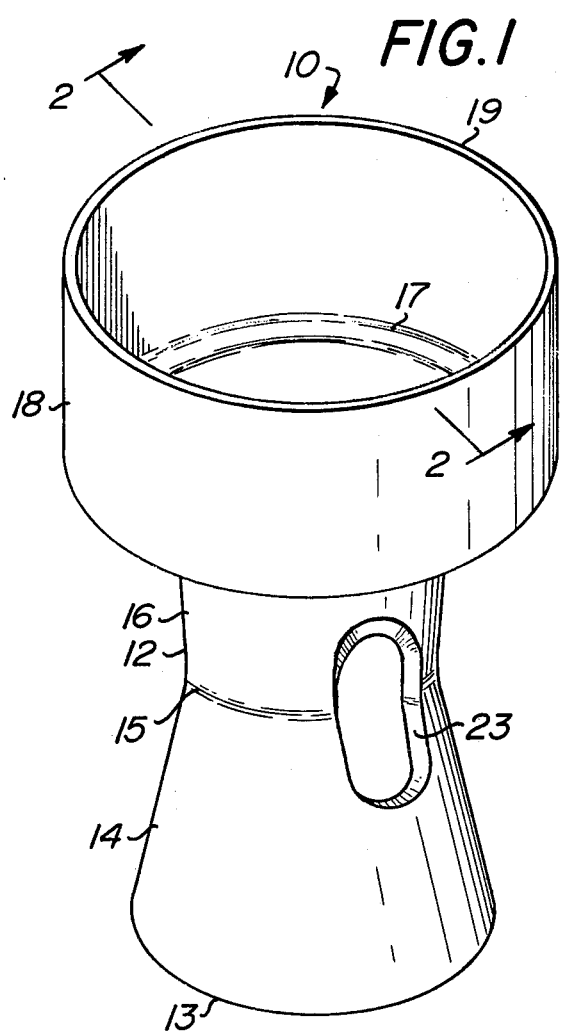
FIG. 1 is a perspective view illustrating an ice cream cone packing jacket and holder constructed in accordance with the teachings of the present invention.
Figure 2:
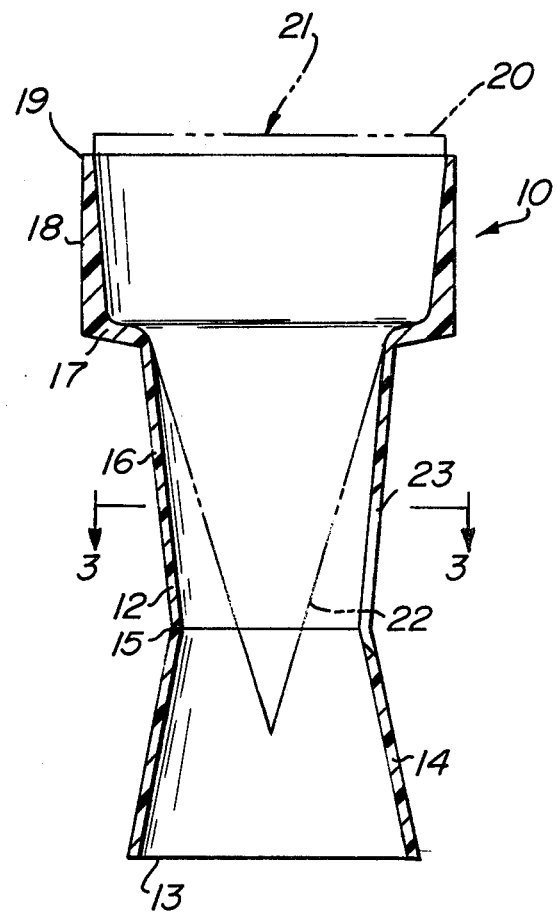
FIG. 2 is a longitudinal sectional view taken generally along the line 2—2 of FIG. 1.

Referring now more particularly to the drawings, and specifically to FIGS. 1 and 2 thereof, a device of the present invention is there generally designated 10, and may be integrally fabricated of any suitable material, such as stiff plastic, or the like, say by injection molding or other suitable means. The ice cream cone packing jacket and holding device may include an elongate generally tubular body 12 terminating at a generally annular end edge 13 disposed in a plane generally normal to the longitudinal direction of the tubular body.

The body 12 includes an end portion 14 which converges or tapers inwardly from the end edge 13 to an intermediate or medial region 15.

The tubular body 12 may flare generally from the medial region 15 outwardly oppositely away from the end 13, as in the region 16. The larger end of body region 16, remote from end 13 is provided with a peripherally extending outstanding annular wall or shelf 17. On the outer edge of the radially outwardly projecting annular shelf 17 is a generally cylindrical, circumferential wall 18, extending longitudinally outwardly of the tubular body 12, generally coaxially therewith, and terminating in an annular outer end edge 19. The annular outer end edge 19 is generally planar, and in a plane generally normal to the axis of tubular body 12, so as to be generally parallel to opposite end edge 13.

The annular shelf 17 and cicumferential wall 18 combine to define a generally circularly, downwardly opening cup sized and shaped to conformably receive the enlarged head 20 of a cake-type ice cream cone 21. With the cone head 20 received in cup 17, 18, the reduced lower end region or tail 22 may enter into the tubular body region 16.

The medial region of body 12, as in the region of juncture 15 between tapering, end-to-end body regions 14 and 16, may be provided with a through wall opening or hole 23, as for passage of a user's finger. Thus, an enlarged head cake cone 21 may be seated in the packing jacket and holder 10, as shown in FIG. 2, and the enlarged cone head 20 may be firmly packed without danger of breakage. With the cone 21 suitably filled with ice cream, the holder 10 may be set aside on any suitable horizontal surface, with end edge 13 in bearing engagement with the surface. Additional cones may then be conveniently filled, in their respective packing jackets and placed aside on a supporting surface, as desired. To facilitate in removing a filled cone from the device 10, a user's finger may enter inwardly through opening 23 engaging a lower region of the received cone, to dislodge the same upwardly for convenient manual grasping and removal.

Figures 4, 5:
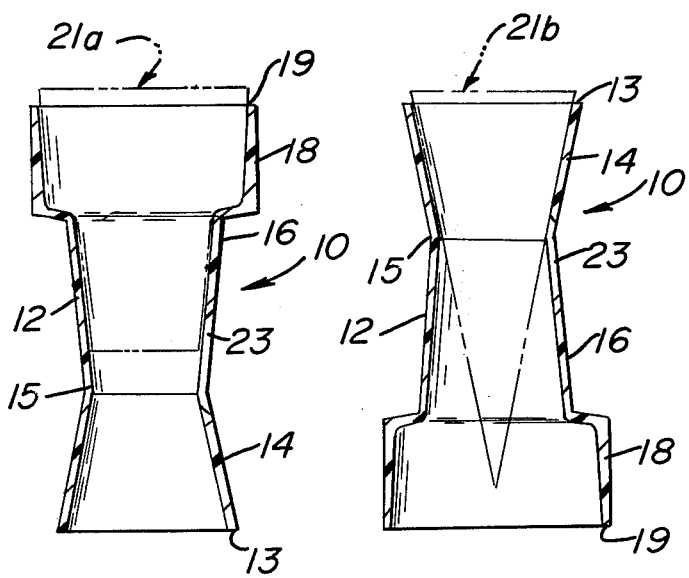
FIG. 4 is a longitudinal sectional view similar to FIG. 2, but showing, in phantom, a soft or cake-type cup.
FIG. 5 is a longitudinal sectional view similar to FIGS. 2 and 4, but inverted and showing in phantom a sugar cone.
Figure 3:
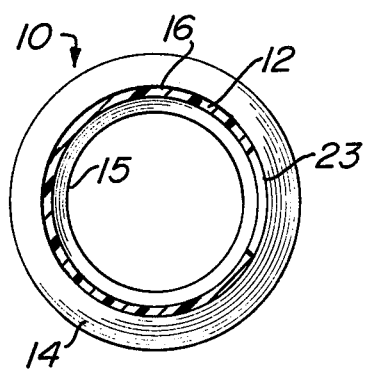
FIG. 3 is a transverse sectional view taken generally along the line 3—3 of FIG. 2.

While a cake-type or soft cone is shown in phantom at 21, it is appreciated that an enlarged head type of cake or soft cup 21a may also be engaged in the same region of packing jacket and holder 10, as in FIG. 4, firmly filled and removed, as described hereinbefore.

While the tapering end portion 14 has been described hereinbefore as supporting base for stably supporting the device 10 in its illustrated upright condition, the device may be inverted, see FIG. 5, and the tapering portion serve to conformably receive a conventional sugar-type ice cream cone 21b. In this condition, the sugar cone is well supported and reinforced to permit of thorough and efficient packing or filling with ice cream, without danger of breaking the cone. In this condition, the end edge 19 now faces downwardly and may provide an engaging edge for supportive bearing engagement with a horizontal surface. Thus, a filled cone may be stably supported in upright condition; and, the finger hole 23 may be employed by a user to engage the sugar cone, dislodging the same upwardly to facilitate its removal from the packing jacket and holder.

It will now be appreciated that an ice cream cone packing jacket and holder is provided which greatly facilitates the filling of a wide variety of ice cream cones, permitting firm packing of the cones without danger of damage thereto, and further affords stable support to filled cones as desired, say during the filling of additional cones, during use, or otherwise.

Although the present invention has been described in some detail by way of illustration and example for purposes of clarity of understanding, it is understood that certain changes and modifications may be made within the spirit of the invention.

What is claimed is:

1. An ice cream cone packing jacket and holder comprising an elongate open ended tubular body, said body tapering conically from one end toward a medial region having the same internal taper as the external taper of a conventional sugar cone for conformably receiving a conical sugar cone, a radially outstanding shelf extending circumferentially about the other end of said body, and a generally cylindrical wall extending circumferentially about the perimeter of said shelf and combining therewith to define a cup opening centrally into the other end of said body, said cup having generally the same internal dimension as the external dimension of the enlarged head of a conventional cake cone to conformably receive the enlarged head of a cake cone with the tail thereof in said body, whereby sugar and cake cones are adapted to be supportively received for packing with ice cream without breakage, said one body end terminating in a plane generally normal to the longitudinal direction of said body for stable resting engagement with a supporting surface with said cup uppermost, and said cylindrical wall having its distal edge lying in a plane generally normal to the longitudinal direction of said body for stable resting engagement with a supporting surface with said one body end uppermost, whereby filled sugar and cake cones are adapted to be stably supported in upright position, said body and cup being integral and substantially rigid to resist cone deformation, and said medial region being formed with an unobstructed through finger opening sized to pass a finger for dislodging a received ice cream cone.

2. An ice cream cone packing jacket and holder according to claim 1, said body tapering conically from its other end toward said medial region.

3. An ice cream cone packing jacket and holder according to claim 1, said body tapering conically from its other end coaxially toward said medial region, said medial region being defined by the juncture of tapers from said body ends, said through finger opening being at said juncture for dislodging a received ice cream cone in a selected one of said tapers.

* * * * *